United States Patent Office 3,125,564
Patented Mar. 17, 1964

3,125,564
DIHALO-TRIAZINYLAMINO-AZO AND ANTHRA-QUINONE DYESTUFF COMPOSITIONS STABILIZED WITH MIXTURES OF ALKALI METAL PHOSPHATES
Robert Norman Heslop and William Elliot Stephen, Manchester, England, assignors to Imperial Chemical Industries Limited, London, England, a corporation of Great Britain
No Drawing. Filed Jan. 9, 1959, Ser. No. 785,977
4 Claims. (Cl. 260—153)

This invention relates to improvements in dyestuffs, in particular dyestuff compositions for commercial use. More specifically this invention is directed to novel dyestuff compositions of dyestuffs containing a C-halogen-1:3:5-triazine ring stabilized by the presence of a mixture of water-soluble phosphate salts, which provide, in aqueous solution, a buffered pH range of from about pH 6 to pH 8.

This application is a continuation-in-part of copending applications Serial Nos. 549,175, now U.S. Patent 2,907,-762; 549,176, now abandoned; 549,177, now U.S. Patent 2,892,828; 549,178, now U.S. Patent 2,892,829; 549,179, now U.S. Patent 2,892,830; 623,760, now U.S. Patent 2,892,831; 634,662, now U.S. Patent 2,889,323; 646,526, now abandoned; 652,684, now abandoned; 680,004, now abandoned; 709,453, now U.S. Patent 3,004,022; 710,874, now abandoned; 737,221, now U.S. Patent 2,977,353; 737,222, now U.S. Patent 2,951,836; 737,223, now abandoned; 741,996, now U.S. Patent 3,087,924; 732,820, now U.S. Patent 2,892,671; 732,841, now U.S. Patent 2,892,-670; 742,039, now U.S. Patent 2,951,070; 742,718; 742,-721, now abandoned; and 754,178, now U.S. Patent 3,-057,844, the disclosures of which are incorporated herein by reference.

BACKGROUND OF THE INVENTION

There are now known a number of azo and anthraquinone dyestuffs which are characterized by having a C-halogen-1:3:5-triazine ring in their molecular structure. By C-halogen-1:3:5-triazine ring is meant a radical having the structural formula:

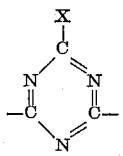

where X represents a halogen atom (attached, as seen, to a nuclear carbon atom of a 1:3:5-triazine ring). In the dyestuffs of present interest, at least one of the indicated free valencies of the other two carbon atoms of the triazine ring is attached to an amino nitrogen atom substituted by at least one chromophoric group of the azo and anthraquinone chromophoric group types. One of the said free valencies may, alternatively, bond a second halogen atom to a nuclear carbon atom, or instead may be attached to any one of a number of non-chromophoric groups, as will be mentioned at greater length hereinafter. It is convenient to refer to the subject class of dyestuffs as azo and anthraquinone dyestuffs containing at least one solubilizing group and a primary or secondary amino group carrying as N-substituent a 1:3:5-triazine radical containing a halogen atom attached to a carbon atom of said triazine ring. Alternatively these dyestuffs may be referred to as mono- and di-(C-halogen)-1:3:5-triazin-2-ylamino-azo and anthraquinone chromophoric group-containing dyestuffs, it being understood that in this nomenclature at least one ionogenic solubilizing group is present in the azo or anthraquinone chromophoric group.

These mono- and di-(C-halogen)-1:3:5-triazin-2-yl-amino-azo and anthraquinone chromophoric group-containing dyestuffs have excellent properties for coloring textile fabrics made from a wide variety of fibers including cellulosic and protein fibers as well as various synthetic fibers such as nylon. The coloring process may be carried out in the manner described in copending applications Serial Nos. 732,820; 732,841; 680,009, now abandoned; 683,012, now U.S. Patent 2,950,165; 585,957, now U.S. Patent 2,892,674; 652,681, now abandoned; 652,682, now abandoned; 696,966, now U.S. Patent 2,940,812 and 664,511; now U.S. Patent 3,042,477. As pointed out in these copending applications, the resulting dyed or printed materials exhibit remarkably fast characteristics of great value.

The commercial value of the mono- and di-(C-halogen) - 1:3:5 - triazin - 2 - ylamino - azo and anthraquinone chromophoric group containing dyestuffs has, however, met with the difficulty that these dyestuffs decompose on storage within a few months under tropical conditions and the di-(C-halogen) dyestuffs decompose appreciably under temperate conditions within the usual time from manufacture to delivery to and use by the dyer. This decomposition can lead to irregular and unsatisfactory dyeings or printings because, of course, the dyestuff per se is present in less than the expected quantity or not at all, and foreign substances are also present which interfere with the dyeing process.

In addition, the very preparation of the subject dyestuffs can be severely hindered by this decomposition. Thus, the usual and convenient mode of preparation of these mono- and di-(C-halogen)-1:3:5-triazin-2-ylamino-azo and anthraquinone chromophoric group-containing dyestuffs is by reaction of an azo or anthraquinone chromophoric group-containing primary or secondary amine with a di- or tri-(C-halogen)-1:3:5-triazine ring compound to form the triazinylamino structure, with loss of hydrogen halide. Alternatively, an already formed and suitably substituted mono- or di-(C-halogen)-1:3:5-triazin-2-yl-amino compound may be reacted with a diazonium or coupling compound to form an azo-chromophoric group-containing dyestuff. Other methods of preparation are also possible. In general, however, it is frequently desirable for preparatory purposes to carry out the reaction involved in an aqueous suspension or solution. Unfortunately, when water is present it has frequently been found that the desired product is obtained in low yield and poor quality, due to decomposition involving, at least in part, the replacement of the halogen attached to the triazine nucleous by hydroxyl, both during the reaction period and during the isolation of the dyestuff. Of course, the already mentioned storage decomposition takes place whether or not the dyestuff preparation was carried out in the absence of water.

The prevention of such decomposition and stabilization of the subject dyestuffs is therefore a serious problem which has been a contributory factor to the previous lack of development of this segment of the dyestuff art.

OBJECTS OF THE INVENTION

Accordingly, it is an object of this invention to provide novel stabilized dyestuff compositions which contain as the principal coloring material therein a mono- or di-(C-halogen)-1:3:5-triazin-2-ylamino-azo- or anthraquinone-chromophoric group-containing dyestuff and as a stabilizer therefor a mixture consisting essentially of water-soluble phosphate salts, which phosphate salt mixture has, in aqueous solution a buffered pH of from 6 to 8.

It is a further object of this invention to provide a process for stabilizing dyestuff compositions which contain as the principal coloring matter therein a mono- or di- (C-halogen)-1:3:5-triazin-2-ylamino-azo or anthraquinone chromophoric group containing dyestuff wherein before or during the preparation, isolation or formulation of such dyestuff there is added thereto, as a stabilizer, a mixture of water-soluble phosphate salts, which phosphate salt mixture has, in aqueous solution, a buffered pH of from 6 to 8.

Additionally, it is an object of this invention to provide novel stabilized dyestuff compositions which contain as the principal coloring material, in an amount of at least about 20% by weight therein, a mono- or di-(C-halogen)-1:3:5-triazin-2-ylamino-azo- or anthraquinone-chromophoric group-containing dyestuff and as a stabilizer therefore at least 1%, by weight of the composition, of a mixture of water-soluble phosphate salts, which phosphate salt mixture has, in aqueous solution, a pH of from 6 to 8, and wherein there may also be present inert materials.

Other objects of this invention will be apparent from the following description thereof.

DESCRIPTION OF THE INVENTION

As hereinbefore stated, the present invention provides a stabilized dyestuff composition whereas the dyestuffs in the absence of the presence of the stabilizer will decompose. It is a feature of this invention that to the best of our knowledge there are no dyestuffs in the class of azo and anthraquinone dyestuffs containing at least one ionogenic solubilizing group and a primary or secondary amino group carrying a N-substituent, a 1:3:5-triazine radical containing a halogen atom attached to a carbon atom of said triazine ring which are not stabilized in the composition of the present invention. Nor are there, to our knowledge, any substituents which may be present on such azo and anthraquinone dyestuffs which interfere with the stabilized characteristics of the composition.

DESCRIPTION OF AZO AND ANTHRAQUINONE CHROMOPHORIC GROUPS

Thus among the dyestuffs which may be used in the practice of this invention are those which contain, as an aminoazo chromophoric group attached to the 2-position on the triazine ring, the amino radicals from the product obtained by coupling diazotized aniline with 1:8-aminonaphthal-3:6-disulfonic acid (so that the azo group is attached in the 7-position), or by coupling diazotized metanilic acid with o-anisidine; or as the aminoanthraquinone chromophoric group attached to the said 2-position, amino radicals from compounds such as 1-amino-4-(4'-aminoanilino)-anthraquinone-2:3'-disulfonic acid.

Other anthraquinoneamino derivatives which may be used include 1-amino-4-(3'-aminoanilino)-anthraquinone-2,4'-disulfonic acid,
1-amino-4-(2'-methyl-5'-aminoanilin)-anthraquinone-2,4'-disulfonic acid,
1-amino-4-(2'-methyl-3'-aminoanilino)-anthraquinone-2,5-'disulfonic acid,
1-amino-4-(4'-(4''-aminophenylazo)-anilino)-anthraquinone-2,3''-disulfonic acid,
1-amino-4-(3'-carboxy-4'-aminoanilino)-anthraquinone-2-sulfonic acid, and
1-amino-4-(4'-(4''-aminophenyl)-anilino)-anthraquinone-2,3''-disulfonic acid.

In each instance, the aromatic ring carried by the 4-amino group on the anthraquinone nucleous may be substituted at any of the available positions by radicals such as lower alkyl, lower alkoxy, halogen, halogen-substituted lower alkyl and lower alkoxy, hydroxy-substituted lower alkyl and lower alkoxy, and/or additional ionogenic solubilizing groups, and including similarly substituted phenyl radical substituents.

Further anthraquinone chromophoric amino radicals which may be present include 1-amino-4-(4'-aminoanilino)-anthraquinone-2:3':5-trisulfonic acid,
1-amino-4-(4'-(4''-aminophenylazo)-anilino)-anthraquinone-2:2'':5-trisulfonic acid,
1-amino-4-(4'-aminoanilino)-anthraquinone-2:3':6-trisulfonic acid,
1-amino-4-(4'-amino-3'-carboxyanilino)-anthraquinone-2:5-disulfonic acid,
1-amino-4-(3'-aminoanilino)-anthraquinone-2:4':5-trisulfonic acid, and
1-amino-4-(4'-(4''-aminophenyl)-anilino)-anthraquinone-2:3'':5-trisulfonic acid.

There may also be used 1-amino-4-(4'-methylaminoanilino)-anthraquinone-2:3':5-trisulfonic acid,
1-amino-4-(4'-methylaminoanilino)-anthraquinone-2:3'-disulfonic acid,
1-amino-4-(4'-n-butylaminoanilino)-anthraquinone-2:3'-disulfonic acid,
1-amino-4-(4'-cyclohexylaminoanilino)-anthraquinone-2:3'-disulfonic acid,
1-amino-4-(4'-methylamino-3'-carboxyanilino)-anthraquinone-2-sulfonic acid, and
1-amino-4-(3'-(β-hydroxyethylamino)-anilino)-anthraquinone-2:5-disulfonic acid,
1-amino-4-(4'-methylamino)-anilinoanthraquinone-2-sulfonic acid,
1-amino-4-(4'-aminoanilino)-anthraquinone-2:3-disulfonic acid,
1-amino-4-anilino-anthraquinone-2:5-disulfonic acid,
1-amino-4-(4'-aminoanilino)-anthraquinone-2:5-disulfonic acid,
1-amino-4-(4'-(4''-aminophenylazo)-anilino)-anthraquinone-2:3'':5-trisulfonic acid,
1-amino-4-(4'-aminoanilino)-anthraquinone-2-sulfonic acid,
1,4-diaminoanthraquinone-2-sulfonic acid,
1:5-dihydroxy-4,8-di(4'-aminoanilino)-anthraquinone-2:6-disulfonic acid,
6-(4'-aminoanilino)-2-(2''-hydroxyphenyl)-anthrapyrimidine-3':3''-disulfonic acid, and
1-β-sulfato-isopropylamino-4-(4'-aminoanilino)-anthraquinone-3'-sulfonic acid.

In addition to these typical anthraquinone radicals, among the aminoazo chromophoric group-containing radicals which may be used are 1-amino-7-(phenylazo)-8-hydroxy-naphthalene-3:6-disulfonic acid, and the aminoazo compounds obtained by coupling diazotized metanilic acid with 1-acetylamino-8-naphthol-3:6-disulfonic acid, by coupling diazotized p-aminoacetanilide or diazotized 2-amino-4-sulfophenylether with 1-amino-8-hydroxynaphthalene-3:6-disulfonic acid, and 1-amino-8-hydroxy-7-(phenylazo)-naphthalene-3:6:6'-trisulfonic acid,
1-amino-8-hydroxy-7-(2':4'-dimethylanilino)-naphthalene-3:6:6'-trisulfonic acid,
1-amino-8-hydroxy-7-(3'-chloro-4'-methylphenylazo)-naphthalene-3:6:6'-trisulfonic acid,
1-amino-8-hydroxy-7-(4'-methylphenylazo)-naphthalene-3:6:6'-trisulfonic acid,
1-amino-8-hydroxy-7-(4'-chloro-3'-methylphenylazo)-naphthalene-3:6:6'-trisulfonic acid,
1-amino-8-hydroxy-7-(4'-chlorophenylazo)-naphthalene-3.6:2'-trisulfonic acid,
1-amino-8-hydroxy-7-phenylazonaphthalene-3:6:2':5'-tetrasulfonic acid,
1-amino-8-hydroxy-7-(3'-trifluoromethyl-phenylazo)-naphthalene-3:6:2'-trisulfonic acid,
1-amino-8-hydroxy-7-(3'-4'-dichlorophenylazo)-naphthalene-3:6:6'-trisulfonic acid, 1-amino-8-hydroxy-7-(3'-methoxyphenylazo)-naphthalene-3:6:6'-trisulfonic acid,
1-amino-8-hydroxy-7-phenylazo-naphthalene-4:6:2'-trisulfonic acid,
1-amino-8-hydroxy-7-(4'-methylphenylazo)-naphthalene-4:6:2'-trisulfonic acid,
1-amino-8-hydroxy-7-(4'-chlorophenylazo)-naphthalene-4:6:2'-trisulfonic acid, and
1-amino-8-hydroxy-7-(3'-trifluoromethylphenylazo)-naphthalene-4:6:6'-trisulfonic acid.

Whereas with these just mentioned azo chromophoric radicals the subject dyestuffs will have the triazine separated from the azo group by the substituted naphthaleneamino nucleous, the reverse structure is possible as where there are used aminoazo chromophoric groups such as 4-(α-naphthylazo)-3-methylaniline-4':8'-disulfonic acid,
4-(α-naphthylazo)-3-methylaniline-6':8'-disulfonic acid,
4-(α-naphthylazo)-2-methylaniline-6':8'-disulfonic acid,
4-(α-naphthylazo)-2:5-dimethoxyaniline-4':8'-disulfonic acid,
4-(α-naphthylazo)-2-methoxyaniline-4'8'-disulfonic acid,
4-(α-naphthylazo)-2-methoxy-5-methyl-aniline-4':8'-disulfonic acid,
4-(α-naphthylazo)-2-methoxy-5-methyl-aniline-6':8'-disulfonic acid,
4-(α-naphthylazo)-2-methoxy-5-methyl-N-ethylaniline-4':8'-disulfonic acid, and
4-(α-naphthylazo)-3-methyl-N-ethylaniline-4':8'-disulfonic acid, or, in general, those aminoazo radicals formed from the compounds obtained by coupling 4:8- or 6:8-disulfonic-β-naphthyldiazonium salts with primary and secondary amines including o-toluidine,
m-toluidine,
2:5-dimethylaniline,
o-anisidine,
m-anisidine,
3-amino-4-methoxytoluene,
2:5-dimethoxyaniline,
N-methylaniline,
N-ethyl-o-toluidine,
N-methyl-m-toluidine,
N-ethylaniline,
N-ethyl-o-toluidine,
N-ethyl-m-toluidine,
N-methylcresidine,
N-ethylcresidine,
N-methyl-m-anisidine and
N-ethyl-m-anisidine.

The aminoazo chromophoric grouping can also contain various heterocyclic nucleii such as in the amino radicals formed from compounds including 1-(2'-chloro-5'-sulfophenyl)-3-methyl-4-(2''-sulfo-5''-aminophenylazo)-5-pyrazolone,
1-(3'-aminophenyl)-3-methyl-4-(2'':5''-disulfophenylazo)-5-pyrazolone,
1-(2'-methyl-5'-sulfophenyl)-3-methyl-4-(2''-sulfo-4''-aminophenyl)-5-pyrazolone,
1-(4'-sulfophenyl)-3-carboxy-4-(2''-sulfo-5''-aminophenylazo)-5-pyrazolone,
1-(3'-aminophenyl)-3-carboxy-4-(2''-carboxy-4''-sulfophenylazo)-5-pyrazolone,
1-(2':5'-dichloro-4'-sulfophenyl)-3-methyl-4-(2''-sulfo-4''-aminophenylazo)-5-pyrazolone,
1-(2'-sulfophenyl)-3-methyl-4-(2''-sulfo-4''-aminophenylazo)-5-pyrazolone,
1-(4'-sulfophenyl)-3-carboxy-4-(2''-sulfo-4''-aminophenylazo)-5-pyrazolone,
1-(6'-chloro-4'-sulfo-2'-methylphenyl)-3-methyl-4-(2''-sulfo-4''-aminophenylazo)-5-pyrazolone,
1-(6'-chloro-3'-sulfo-2'-methylphenyl)-3-methyl-4-(2''-sulfo-4''-aminophenylazo)-5-pyrazolone,
1-(4'-sulfophenyl)-3-bethyl-4-(2''-sulfo-4''-aminophenylazo)-5-pyrazolone,
1-(2':5'-dichloro-4'-sulfophenyl)-3-methyl-4-(2''-sulfo-5''-aminophenylazo)-5-pyrazolone,
1-(4'-sulfophenyl)-3-carboxy-4-(2''-sulfo-5''-aminophenylazo)-5-pyrazolone,
1-(2'-methyl-5'-sulfophenyl)-3-methyl-4-(2''-sulfo-5''-aminophenylazo)-3-methyl-5-pyrazolone,
1-(4'-sulfo-6'-chloro-o-tolyl)-3-methyl-4-(2''-sulfo-5''-aminophenylazo)-5-pyrazolone,
1-(2'-sulfophenyl)-3-methyl-4-(2''-sulfo-5''-aminophenylazo)-5-pyrazolone,
1-(4'-methoxy-2'-sulfophenyl)-3-methyl-4-(2''-sulfo-5''-aminophenylazo)-5-pyrazolone.

Various compounds of the type just listed suitable as providing the aminoazo chromophoric grouping in the subject dyestuffs are provided from by having a 5-pyrazolone such as 1-(4'-sulphophenyl)-3-methyl-5-pyrazolone,
1-(6'-chloro-3'-methyl-4'-sulphophenyl)-3-methyl-5-pyrazolone,
1-(2':5'-dichloro-4'-sulphophenyl)-3-methyl-5-pyrazolone,
1-(2'-methyl-5'-sulphophenyl)-3-methyl-5-pyrazolone,
1-(2'-chloro-5'-sulphophenyl)-3-methyl-5-pyrazolone,
1-(4'-chloro-2'-sulphophenyl)-3-methyl-5-pyrazolone,
1'-(6'-chloro-4'-sulpho-2'-methylphenyl)-3-carboethoxy-5-pyrazolone,
1-(6'-chloro-4'-sulpho-2'-methylphenyl)-3-methyl-5-pyrazolone,
1-(4'-methyl-2'-sulphophenyl)-3-methyl-5-pyrazolone,
1-(2':5'-disulphophenyl)-3-methyl-5-pyrazolone,
1-(4'-ethoxy-2'-sulphophenyl)-3-methyl-5-pyrazolone,
1-(2':4'-dichloro-5'-sulphophenyl)-3-methyl-5-pyrazolone,
1-(6'-chloro-3'-sulpho-2'-methylphenyl)-3-methyl-5-pyrazolone,
1-(4'-sulphophenyl)-3-carboxy-5-pyrazolone,
1-(3':5'-disulphophenyl)-3-methyl-5-pyrazolone,
1-(4'-carboxyphenyl)-3-methyl-5-pyrazolone,
1-(3'-carboxyphenyl)-3-methyl-5-pyrazolone,
1-(2'-carboxyphenyl)-3-methyl-5-pyrazolone,
1-phenyl-3-carboxy-5-pyrazolone and
1-p-tolyl-3-carboxy-5-pyrazolone, azo-coupled with the diazonium salt of an aromatic primary amine such as m- and p-nitroaniline, 4-nitroaniline-2-sulphonic acid, 3-nitroaniline-6-sulphonic acid, m- or p-aminoacetanilide, 4-aminoacetanilide-3-sulphonic acid, 3-aminoacetanilide-4-sulphonic acid and 4-amino-2-acetotoluidide-5-sulphonic acid, where further reaction such as nitro-group reduction or acylamino hydrolysis introduces a free amino group in the coupled product; or, where the 5-pyrazolone already has a primary aromatic amine of the benzene series, such as 1-(3'-aminophenyl)-3-methyl-, carboxy- and carboethoxy-5-pyrazolones, 1-(4'-aminophenyl)-3-methyl-, carboxy-, and carboethoxy-5-pyrazolones and 1-(4'-amino-3'-carboxyphenyl)-3-methyl-5-pyrazolone, the azo-coupled product thereof with the diazonium salt of a primary aromatic amine of the benzene series such as orthanilic acid, 2:5-disulphoaniline, 4-methyl-2-sulphoaniline, 5-chloro-4-methyl-2-sulphoaniline, 4-chloro-5-methyl-2-sulphoaniline, 5-methoxy-2-sulphoaniline, sulphanilic acid and 2:5-dichloro-4-sulphoaniline.

Still other carbocyclic aminoazo chromophoric groups which may be used are those of compounds such as 2-amino-7-phenylazo-8-naphthol-2':5':6-trisulfonic acid,
2-amino-7-(4'-methylphenyl)-azo-8-naphthol-2':6-disulfonic acid,
2-methylamino-7-phenylazo-8-naphthol-2':6-disulfonic acid, 2-amino-7-(2':4'-dimethylphenylazo)-8-naphthol-6:6'-disulfonic acid,
2-methylamino-7-(4'-methoxyphenylazo)-8-naphthol-2':6-disulfonic acid,
2-amino-7-(3'-methyl-4'-chlorophenylazo)-8-naphthol-6:6'-disulfonic acid,
2-amino-7-p-tolylazo-8-naphthol-6:6'-disulfonic acid,
2-amino-7-phenylazo-8-naphthol-2':5':6-trisulfonic acid,
2-amino-7-(4'-chlorphenylazo)-8-naphthol-6:6'-disulfonic acid,
2-amino-7-m-tolylazo-8-naphthol-6:6'-disulfonic acid,
2-amino-7-(3'-chloro-p-tolylazo)-8-naphthol-6:6'-disulfonic acid,
2-amino-7-o-tolylazo-8-naphthol-5':6-disulfonic acid,
2-amino-7-(4'-methoxyphenylazo)-8-naphthol-2':6-disulfonic acid,
2-amino-7-(2'-o-tolyloxyphenylazo-8-naphthol-5':6-disulfonic acid,
2-methylamino-7-(α-naphthylazo)-8-naphthol-4':6-disulfonic acid,
2-methylamino-7-(α-naphthylazo)-8-naphthol-3':6':6-trisulfonic acid,
2-methylamino-7-(α-naphthylazo)-8-naphthol-3':6:7' trisulfonic acid,
2-methylamino-7-(β-naphthylazo)-8-naphthol-1':5':6-trisulfonic acid,
2-methylamino-7-(α-naphthylazo)-8-naphthol-6:6'-disulfonic acid,
2-methylamino-7-(α-naphtholazo)-8-naphthol-6:7-disulfonic acid,
2-methylamino-7-(β-naphthylazo)-8-naphthol-3':6':6-trisulfonic acid,
2-methylamino-7-(2'-methoxy-5'-chlorphenylazo)-8-naphthol-3':6-disulfonic acid,
2-methylamino-7-(2'-methoxy-3'-chlorphenylazo)-8-naphthol-5':6-disulfonic acid,
2-methylamino-7-phenylazo-8-naphthol-2':6-disulfonic acid, and
2-methylamino-7-(p-methoxyphenylazo)-8-naphthol-2':6-disulfonic acid.

Thus, there may be used the aminoazo radicals obtained by coupling the diazonium salt of a primary aromatic amine such as aniline, o-, m- and p-toluidines, xylidines, o-, m- and p-anisidine, mono- or polychloroanilines, aniline 2-, 3- and 4-sulphonic acids, 2:4-dimethylaniline-6-sulphonic acid,
4-chloro-5-methylaniline-2-sulphonic acid,
5-chloro-4-methylaniline-2-sulphonic acid,
aniline-2:5-disulphonic acid,
4-methylaniline-2-sulphonic acid,
3-methylaniline-6-sulphonic acid,
4-methoxyaniline-2-sulphonic acid,
2:5-dichloroaniline-4-sulphonic acid,
2-aminotoluene-4-sulphonic acid,
aniline 2-, 3- and 4-carboxylic acids,
4-aminodiphenyl-3- and -4'-sulphonic acids,
1- or 2-aminonaphthalene,
1-aminonaphthalene-4-, 5-, 6- and 7-monosulphonic acids,
2-aminonaphthalene-3:6 and 3:7-disulphonic acids,
2-aminonaphthalene-1:5-, 4:8-, 6:8-, 5:7- and 3:6-disulfonic acids and 2-naphthylamine - 3:6:8 - trisulphonic acid, and similar alkyl, alkoxy, halo and acylamido substituted compounds, with a coupling component such as 2-amino-8-naphthol-6-sulphonic acid,
2-methylamino-8-naphthol-6-sulphonic acid,
2-methylamino-1-chloro-8-naphthol-6-sulphonic acid,
2-amino-8-naphthol-3:6-disulphonic acid and
2-amino-3-carboxy-8-naphthol-6-sulphonic acid.

The corresponding 2-acetylamino and 2-formamido-compounds may also be used as coupling components.

In addition, as aminoazo chromophoric groups there may be used the amino radicals obtained from sulfo-phenylnaphtholamines provided by coupling a diazotized primary aromatic amine such as aniline-2-sulphonic acid,
aniline 2:5-disulphonic acid,
2:4-dimethylaniline-6-sulphonic acid,
3-aminobenzotrifluoride-4-sulphonic acid,
4-chloro-5-methylaniline-2-sulphonic acid,
5-chloro-4-methylaniline-2-sulphonic acid,
3-acetylaminoaniline-6-sulphonic acid,
4-acetylaminoaniline-2-sulphonic acid,
4-chloroaniline-2-sulphonic acid,
3:4-dichloroaniline-6-sulphonic acid,
4-methylaniline-2-sulphonic acid,
3-methylaniline-6-sulphonic acid,
2:4-dimethoxyaniline-6-sulphonic acid,
4-methoxyaniline-2-sulphonic acid and
5-methoxyaniline-2-sulphonic acid, with
2-amino-5-naphthol-7-sulfonic acid and
N-substituted-2-amino-5-naphthol-7-sulfonic acids, (optionally with a later removed N-acyl structure) particularly N-alkyl-2-amino-5-naphthol-7-sulfonic acids, in the 6-position. Such azoamino dyestuffs include 2-amino-5-hydroxy-6-phenylazo-naphthalene-2':7-disulfonic acid,
2-amino-5-hydroxy-6-(p-tolylazo)-naphthalene-2':7-disulfonic acid,
2-amino-5-hydroxy-6-(3'-methyl-4'-chlorophenylazo)-naphthalene-2':7-disulfonic acid,
2-amino-5-hydroxy-6-(4'-chlorophenylazo)-naphthalene-2':7-disulfonic acid,
2-amino-5-hydroxy-6-phenylazo-naphthalene-2':5':7-trisulfonic acid,
2-methylamino-5-hydroxy-6-phenylazonaphthalene-2':7-disulfonic acid,
2-amino-5-hydroxy-6-(3'-chloro-4'-methylphenylazo)-naphthalene-2':7-disulfonic acid,
2-amino-5-hydroxy-6-(5'-methoxyphenylazo)-naphthalene-2':7-disulfonic acid, and
2-amino-5-hydroxy-6-(5'-methylphenylazo)-naphthalene-2':7-disulfonic acid.

In the just named compounds, the amino group, which eventually becomes the 2-ylamino group on the triazine ring, was attached directly to the naphthol nucleus linked in turn to the azo radical. This is not necessary since there may be equally well used in this invention those azo dyestuffs where there is a bridging radical between the nucleus and the amino group. Such dyestuffs include 1-(3'-aminobenzamido)-7-phenylazo-8-naphthol-2":3:6-trisulfonic acid,
1-(3'-aminobenzamido)-7-phenylazo-8-naphthol-2':5":3"6:-tetrasulfonic acid,
1-(4'-aminobenzamido)-7-phenylazo-8-naphthyl-2":3:6-trisulfonic acid,
1-(3'-aminobenzamido)-7-(3"-chloro-4"-methyl-phenylazo)-8-naphthol-6":3:6-trisulfonic acid,
1-(3'-aminobenzamido)-7-(4"-methylphenylazo)-8-naphthols-2":3:6-trisulfonic acid,
1-(3'-aminobenzamido)-7-(4"-methoxyphenylazo)-8-naphthol-3":3:6-trisulfonic acid,
1-(3'-aminobenzamido)-7-(3":4"-dichlorophenylazo)-8-naphthol-6":3:6-trisulfonic acid,
1-(3'-aminobenzamido)-7-(3"-methylphenylazo)-8-naphthol-6":3:6-trisulfonic acid,
1-(3'-aminobenzamido)-7-(β-naphthylazo)-8-naphthol-4-":5":3:6-tetrasulfonic acid,
1-(3"-aminobenzamido)-7-(β-naphthylazo)-8-naphthol-1":3:6-trisulfonic acid,
1-(3"'-aminobenzamido)-7-(α-naphthylazo)-8-naphthol-2":3:6-trisulfonic acid,
1-(3'-aminobenzamido)-7-(4'-chlorophenylazo)-8-naphthol-2":3:6-trisulfonic acid,
1-(3'-aminobenz-N-(n-butyl)-amido)-7-phenylazo-8-naphthol-2":3:6-trisulfonic acid, 1-(3'-aminobenzamido)-7-phenylazo-8-naphthol-2":3:6-trisulfonic acid, and
1-(3'-aminobenzamido)-7-(3"-trifluoromethylphenylazo)-8-naphthol-2":3:6-trisulfonic acid.

That is, there may be used those amino azo compounds formed by coupling a diazotized primary aromatic amine such as orthanilic acid,
sulphanilic acid,
aniline-2:5-disulphonic acid,
4-chloroaniline-2-sulphonic acid,
5-chloro-4-methylaniline-2-sulphonic acid,
4-methylaniline-2-sulphonic acid,
4-chloro-5-methylaniline-2-sulphonic acid,
3-amino-4-sulphonbenzotrifluoride, 3:4-dichloroaniline-6-sulphonic acid,
4-aminoanisole-3-sulphonic acid,
3-aminoanisole-4-sulphonic acid,
1-naphthylamine-2-sulphonic acid,
2-naphthylamine-3:6-disulphonic acid and
2-naphthylamine-1-sulphonic acid (which may also be substituted by such groups as halogen, phenoxy, nitro, sulfamyl or mono- or di- substituted sulfamyl, carboxylic acid, carboxylic ester, carbamyl or mono- or di- substituted carbamyl groups in addition to further sulfo radicals) with an amino coupling component such as 1-(3'-amino-benzoylamino)-8-hydroxynaphthalene-3:6- and 4:6-disulphonic acids, 1-(4'-aminobenzoylamino) - 8-hydroxynaphthalene-3:6- and 4:6-disulphonic acids, 1 - (3'-aminobenzoylamino)-8-hydroxynaphthalene-2:4-disulphonic acid and 1-(3'-aminobenzoylamino)-8-hydroxynaphthalene-6-sulphonic acid.

Again, the amino group may be alkylamino on the naphthalene ring in the 1-position, as in compounds such as 1-N-ethyl-amino-7-(4'-methoxyphenylazo)-8-naphthol-2':3:6-trisulfonic acid,
1-N-ethyl-amino-7-(4'-methyl-6'-chlorophenylazo)-8-naphthol-2':3:6-trisulfonic acid,
1-N-ethyl-amino-7-(2'carboxyphenylazo)-3:6-disulfonic acid,
1-N-butyl-amino-7-(4'-methoxyphenylazo)-8-naphthol-2':3:6-trisulfonic acid,
1-N-methylamino-7-phenylazo-8-naphthol-2':6-disulfonic acid,
1-N-ethylamino-7-(2':5'-dichlorophenylazo)-8-naphthol-3:6-disulfonic acid,
1-N-ethylamino-7-(4'-dodecylphenylazo)-8-naphthol-2':3:6-trisulfonic acid,
1-N-ethylamino-7-(2'-carbobutoxyphenylazo)-8-naphthol-3:6-disulfonic acid,
1-N-ethylamino-7-(2'-carboethoxyphenylazo)-8-naphthol-3:6-disulfonic acid, and
1-N-butylamino-7-(2'-naphthylazo)-8-naphthol-1':3:6-trisulfonic acid.

Thus, in general, the aminoazo radical may be that obtained from the compound formed by coupling a diazotized primary aromatic amine such as orthanilic acid,
4-aminoanisole-3-sulphonic acid,
anthranilic acid,
5-chloro-anthranilic acid,
o-aminobenzenesulphonamide,
o-aminobenzenesulphon-N-ethylanilide,
o-aminobenzene-2-alkylsulphone,
5-nitroanthranilic acid,
5-nitro-2-aminobenzonitrile and
o-aminobenzotrifluoride to the 7-position of a 1:8-naphthol amine such as 1-methylamino-8-hydroxynaphthalene-3:6-disulphonic acid,
1-ethylamino-8-hydroxynaphthalene-3:6-disulphonic acid,
1-n-butylamino-8-hydroxynaphthalene-3:6-disulphonic acid,
1-methylamino-8-hydroxynaphthalene-4:6-disulphonic acid,
1-ethylamino-8-hydroxynaphthalene-4:6-disulphonic acid,
1-n-butylamino-8-hydroxynaphthalene-4:6-disulphonic acid, and 1-methylamino-, 1-ethylamino, and 1-butylamino-8-hydroxynaphthalene-6-sulphonic acids. The aromatic nucleous of the primary aromatic amine may also contain additional substituents such as cyano, sulfonamido, substituted sulfonamido, sulfone, and trifluoro methyl (particularly at the position ortho to the azo group) and alkyl groups such as methyl, alkoxy groups such as methoxy and ethoxy, trifluoromethyl groups, and halogen atoms such as chlorine and bromine.

Examples of aminoazo radicals wherein there is a bridging group between the amino group and an arylazo group include those formed from such compounds as 1-(4'-amino-3'-methylphenylazo)-benzene-2:5-disulfonic acid,
2-(2'-methyl-4'-amino-5'-methoxyphenylazo)-naphthalene-3:6-disulfonic acid,
2-(2'-methyl-4'-aminophenylazo)-naphthalene-3:6-disulfonic acid,
2-(3'-methyl-4'-aminophenylazo)-naphthalene-3:6-disulfonic acid,
2-(4'-(1'-amino)-naphthylazo)-naphthalene-3:6:6'-trisulfonic acid,
2-(4'-N-methylamino-phenylazo)-naphthalene-3:6-disulfonic acid,
1-(2'-methyl-4'-aminophenylazo)-benzene-2:4-disulfonic acid,
1-(2'-methyl-4'-aminophenylazo)-benzene-3:5-disulfonic acid,
1-(2'-methyl-4'-aminophenylazo)-4-methylbenzene-2:6-disulfonic acid,
1-(2'-methyl-4'-aminophenylazo)-naphthalene-3:6-disulfonic acid,
1-(2'-methyl-4'-aminophenylazo)-naphthalene-3:7-disulfonic acid,
2-(2'-methyl-4-aminophenylazo)-naphthalene-1:5-disulfonic acid,
2-(4'-(1'-amino)-naphthylazo)-naphthalene-1:5:7'-trisulfonic acid, and
2-(2'-methyl-4'-aminophenylazo)-naphthalene-5:7-disulfonic acid.

Thus, the aminoazo radical may be provided by the compounds obtained by coupling, for example diazotized aniline-2:4-, 2:5- and 3:5-disulphonic acids, 4-aminotoluene-2:5-, 2:6- and 3:5-disulphonic acids, 2-aminotoluene-3:5-disulphonic acid, 6-chloro-2-aminotoluene-3:5-disulphonic acid, 4- and 5-sulpho-2-aminobenzoic acids, 2 - aminoterephthalic acid, 1-naphthylamine-2:4-, 2:5-, 2:6-, 2:7-, 3:6-, 3:7-, 4:6-, 4:7- and 5:7-disulphonic acids and 2-naphthylamine-1:5', 3:6-, 3:7-, 4:6-, 4:7-, or 5:7-disulphonic acids with, as coupling component, for example, o-toluidine, m-toluidine, m-anisidine, 3-amino-4-methoxy-toluene, 2:5-dimethylaniline, 2:5-dimethoxyaniline, N-methyl- or N-ethyl-o-toluidines, N-methyl- or N-ethyl-m-toluidines or 1-naphthylamine-6- or 7-sulphonic acids. There may also be used the N(omega-sulphomethyl) derivatives of such coupling components, the azo compounds so obtained being treated, for example by heating with dilute aqueous alkali, to remove the N-(omega-sulphomethyl) grouping.

Still other aminoazo radicals are those provided by such compounds as 2-(2'-methylphenylazo)-naphthalene-3:6:8-trisulfonic acid, 2-(4'-α-aminonaphthylazo)-naphthalene-3:6:8:6'-tetrasulfonic acid, 1-(4'-α-aminonaphthylazo)-naphthalene-2:4:7:6'-tetrasulfonic acid and 1-(2'-methylphenylazo)-naphthalene-2:4:7-trisulfonic acid; that is, those compounds obtained by coupling diazotized trisulfonaphthylamines such as 1 - aminonaphthalene- 2:4:6-, 2:4:7- and 2:5:7-trisulfonic acids, and 2-naphthylamine-1:5:7-, 3:6:8-, and 1:3:7-trisulfonic acids with, as coupling component, an amine such as o-toluidine, m-toluidine, 3-amino-4-methoxytoluene, 2:5-dimethylaniline, m-anisidine, 2:5-dimethoxyaniline, N-methyl- and N-ethyl-o-toluidines, N-methyl and N-ethyl-m-toluidines, and 1-naphthylamine-6- and 7-sulphonic acids. There may also be used the N-(omega-sulphomethyl) derivative of such coupling components, the azo compounds so obtained being treated, for example by heating with dilute aqueous alkali, to remove the N-(omega-sulphomethyl) grouping.

Still another type of aminoazo chromophoric group is that provided by compounds such as 2-(3'-aminophenylazo)-1-hydroxy-8-acetylamino-naphthalene-3:6:6'-trisulfonic acid,
2-(3'-aminophenylazo)-1-hydroxy-8-ethylamino naphthalene-3:6:6'-trisulfonic acid,
2-(3'-aminophenylazo)-1-hydroxy-8-phenylamino naphthalene-3:6:6'-trisulfonic acid,
2-(3'-aminophenylazo)-1-hydroxy-8-ethylamino naphthalene-3:6:6'-trisulfonic acid,
2-(3'-aminophenylazo)-1-hydroxy-8-phenylamino-naphthalene-3:6:6'-trisulfonic acid,
2-(3'-aminophenylazo)-1-hydroxy-8-benzoylamino-naphthalene-3:6:6'-trisulfonic acid,
2-(3'-aminophenylazo)-1-hydroxy-8-aminonaphthalene-3:6:6'-trisulfonic acid,
2-(3'-aminophenylazo)-1-hydroxy-8-phenoxyacetyl-aminonaphthalene-3:6:6'-trisulfonic acid,
2-(3'-aminophenylazo)-1-hydroxy-8-(2":4"-dichloro benzoylamino)-naphthalene-3:6:6'-trisulfonic acid,
2-(3'-aminophenylazo)-1-hydroxy-1-(4"-toluenesulfonylamino)-3:6:6'-trisulfonic acid,
2-(3'-aminophenylazo)-1-hydroxy-8-phenylamino-naphthalene-4:6'-disulfonic acid,
2-(3'-aminophenylazo)-1-hydroxy-8-(4"-toluenesulfonylamino)-naphthalene-4:6:6'-trisulfonic acid,
2-(3'-aminophenylazo)-1-hydroxy-6-acetylamino-naphthalene-3:6'-disulfonic acid,
2-(3'-aminophenylazo)-1-hydroxy-7-acetylamino-naphthalene-3:6'-disulfonic acid,
2-(3'-aminophenylazo)-1-hydroxy-7-dimethylamino-naphthalene-3:6'-disulfonic acid,
2-(3'-aminophenylazo)-1-hydroxy-7-(2"-hydroxy-ethylamino)-naphthalene-3:6'-disulfonic acid,
2-(3'-aminophenylazo)-1-hydroxy-8-carbethoxyamino-naphthalene-3:6:6'-trisulfonic acid,
2-(4'aminophenylazo)-1-hydroxy-6-acetylamino-naphthalene-3:6'-disulfonic acid,
2-(4'-aminophenylazo)-1-hydroxy-8-(2":4"-dichloro-benzoylamino)-naphthalene-3:6:6'-trisulfonic acid,
2-(4'-aminophenylazo)-1-hydroxy-8-phenylamino-naphthalene-3:6:6'-trisulfonic acid,
2-(3'-amino-4'-methyl-phenylazo)-1-hydroxy-8-benzoylaminonaphthalene-3:6:5'-trisulfonic acid,
2-(3'-aminophenylazo)-1-hydroxy-8-aminonaphthalene-3:6:6'-trisulfonic acid,
2-(3'-aminophenylazo)-1-naphthol-4:6'-disulfonic acid,
2-(3'-aminophenylazo)-1-naphthol-3:6:6'-trisulfonic acid,
2-(3'-aminophenylazo)-1-naphthol-3:6:8:6'-tetra-sulfonic acid,
1-(3'-aminophenylazo)-2-naphthol-6:8:6'-trisulfonic acid,
2-(4'-aminophenylazo)-1-naphthol-2':4-disulfonic acid,
1-(4'-aminophenylazo)-2-naphthol-2':6-disulfonic acid,
1-(4'-aminophenylazo)-2-naphthol-2':8-disulfonic acid,
1-(4'aminophenylazo)-2-naphthol-2':6:8-trisulfonic acid,
2-(4'-aminophenylazo)-8-ethoxy-1-naphthol-2':3:6-trisulfonic acid,
1-(4'-aminophenylazo)-2-naphthol-2':3:6-trisulfonic acid,
2-(3'-nitro-4'-aminophenylazo)-1-hydroxy-8-amino-naphthalene-3:6-disulfonic acid,
1-(3'-nitro-4'-aminophenylazo)-2-naphthol-6:8-disulfonic acid,
2-(4'-aminophenylazo)-1:8-dihydroxynaphthalene-3:6-disulfonic acid,
2-(4-aminophenylazo)-1:8-dihydroxynaphthalene-2':3:6-trisulfonic acid,
2-(2'-methoxy-5'-amino-phenylazo)-7-(4''-carboxy phenylamino)-1-naphthol-4':3-disulfonic acid,
2-(2'-methoxy-5'-amino-phenylazo)-8-(4'-toluene-sulfonylamino)-1-naphthol-3:6-disulfonic acid,
2-(4'-aminophenylazo)-6-dimethylamino-1-naphthol-3-sulfonic acid,
2-(4'-amino-2'-chlorphenylazo)-8-acetylamino-1-naphthol-3:6-disulfonic acid,
2-(4'-aminophenylazo)-8-phenylamino-1-naphthol-2':3:5-trisulfonic acid,
2-(4'-amino-3'-carboxyphenylazo)-8-benzoylamino-1-naphthol-3:6-disulfonic acid,
2-(3'-aminophenylazo)-8-(4":6"-dichloro-s-triazin-2"-ylamino)-1-naphthol-3:6:6'-trisulfonic acid,
2-(3'-aminophenylazo)-8-(4"-chloro-6"-amino-s-triazin-2"-ylamino)-1-naphthol-3:6:6'-trisulfonic acid,
2-(3'-aminophenylazo)-8-[3'''-(4''':6'''-dichloro-s-triazin-2'''-ylamino) benzoylamino]-1-naphthol-3:6:6'-trisulfonic acid,
and 2-(3'-aminophenylazo)-8-[4''-chloro-6''-(3'''-sulfophenylamino)-s-triazin-2''-ylamino]-1-naphthol-3:6:6'-trisulfonic acid.

Still further azoamino radicals are provided by the compounds obtained by coupling diazotized primary aromatic amine such as 2-naphthylamine-1-sulfonic acid, 2-naphthylamine-3:6:8-trisulfonic acid, 2-naphthylamine-3:6-disulphonic acid, 2-naphthylamine-4:8-disulphonic acid, 2-naphthylamine-5:7-disulphonic acid, 2-naphthylamine-6:8-disulphonic acid, 2-naphthylamine-1:5-disulphonic acid, 2-naphthylamine-6-sulphonic acid, 1-naphthylamine-4-sulphonic acid, 1-naphthylamine-5-sulphonic acid, 1-naphthylamine-6-sulphonic acid, 1-naphthylamine-7-sulphonic acid, 1-naphthylamine-3:6-disulphonic acid, 1-naphthylamine-3:7-disulphonic acid, and 2-naphthylamine-1:5:7-trisulphonic acid with 1-amino-8-naphthol-3:6-disulfonic acid, 1-amino-8-naphthol-4:6-disulfonic acid or 1-amino-8-napththol-6-sulfonic acid.

Similarly, there may be used the metallized azoamino radicals such as are provided by the compounds obtained by coupling diazotized primary aromatic amines such as 2-aminophenol-4-sulfonamide, 2-aminophenol, 5-nitro-2-aminophenol, 4-sulphamyl-2-aminophenol, 3-amino-4-hydroxy-acetophenone, 5-nitro-2-aminophenoxyacetic acid, 4-methyl-sulphamyl-2-aminophenol, o-anisidine, 4-diethyl-sulphamyl-2-aminoanisole, 4-chloro-2-aminoanisole, 2:5-dimethoxyaniline, 2-amino-iso-phthalic acid, 4-chloro-2-aminophenol, anthranilic acid, 4-ethanesulphonyl-2-aminophenol, 2-aminoterephthalic acid, and 4-nitro-2-aminophenol, with 2-amino-5-naphthol-7-sulfonic acid, 1-amino-5-naphthol-7-sulfonic acid, 2-amino-8-naphthol-6-sulphonic acid, 2-methylamino-5-naphthol-7-sulphonic acid, 2-methylamino-8-naphthol-6-sulphonic acid, 1-amino-8-naphthol-4-sulphonic acid, and 2-butylamino-8-naphthol-6-sulphonic acid; followed by treatment with a copper-yielding agent such as copper sulphate and cuprammonium sulphate, by methods well known in themselves, for example by heating the copper-free compound with an aqueous solution of the copper-yielding agent. In those cases where the metallizable group of the copper-free compound is an alkoxy group, the de-alkylating coppering is carried out advantageously using a cuprammonium salt and usually by heating for several hours at about 100° C. in an aqueous ammoniacal medium.

Other metallized azoamino radicals are those provided by the compounds obtained by coupling a diazotized primary aromatic amine such as 2-aminophenol-4:6-disulphonic acid, 4-nitro-2-aminophenol-6-sulphonic acid, 6-chloro-2-aminophenol-4-sulphonic acid, 4-chloro-2-aminophenol-6-sulphonic acid, 1-amino-6-nitro-2-naphthol-4-sulphonic acid, 4-sulpho-2-aminobenzoic acid, 6-nitro-2-aminophenol-4-sulphonic acid, 5-sulpho-2-aminobenzoic acid, 2-aminophenol-4-sulphonic acid, 2-aminoanisole-4-sulphonic acid, 5-nitro-2-aminoanisole-4-sulphonic acid, and 1-amino-2-naphthol-4-sulphonic acid with a naphthol such as 2-methylamino-5-naphthol-7-sulphonic acid, 2-n-butylamino-5-naphthol-7-sulphonic acid, and 2-ethylamino-5-naphthol-7-sulphonic acid. To convert the copper-free compounds to their complex copper compounds, the copper-free compounds are again treated with a copper-yielding agent such as copper sulphate and cuprammonium sulphate, the latter being preferably used for coppering when the metallizable group is an alkoxy group, by methods well-known in themselves, for example by heating the copper-free compound with an aqueous solution of the copper-yielding agent.

Still other metallized azoamino radicals are those provided by the compounds made by coupling a diazotized primary aromatic amine such as 2-aminophenol-4-sulphonmethylamide, 4-ethane sulphonyl-2-aminophenol, 4-nitro-2-aminophenol-6-sulphonic acid, 6-nitro-2-aminophenol-4-sulphonic acid, 4-chloro-2-aminophenol-6-sulphonic acid, 6-chloro-2-aminophenol-4-sulphonic acid, anthranilic acid, 4-nitro-2-aminophenol, 2-aminophenol, 5-sulpho-2-aminobenzoic acid, 4-chloro-2-aminophenol, 2-aminophenol - 4 - sulphonamide, 2 - aminophenol - 2 - sulphonic acid, 4-nitro-2-aminobenzoic acid, 2-aminoterephthalic acid, 4-methoxy-2-aminophenol, 2-methoxy-1-aminonaphthalene-6-sulphonic acid, 1-amino-6-nitro-2-naphthol-4-sulphonic acid, 4-sulpho-2-aminobenzoic acid with a polysulfoamino-naphthol such as 1-amino-8-naphthol-3:6-disulphonic acid, 1-amino-8-naphthol-4:6-disulphonic acid, 2-amino-5-naphthol-1:7-disulphonic acid, 1-ethylamino-8-naphthol-3:6-disulphonic acid, 1(3'-aminobenzoyl)amino-8-naphthol-3:6-disulphonic acid, 1-butylamino-8-naphthol-3:6-disulphonic acid, 2-amino-8-naphthol-3:6-disulphonic acid, and 1-(4'-aminobenzoyl) amino-8-naphthol-3:6-disulphonic acid. To convert the copper-free compounds to their complex copper compounds, the copper-free compounds are again treated with a copper-yielding agent such as copper sulphate or cuprammonium sulphate the latter being particularly useful when a dealkylative coppering is required, by methods well-known in themselves, for example by heating the copper-free compounds with an aqueous solution of the copper-yielding agent.

In addition, disazoamino radicals may be used such as those provided by compounds obtained by coupling a diazotized primary aromatic amine such as 4-sulfamylaniline, 2-naphthylamine-6-sulfonic acid aniline-2:5-disulphonic acid, 4-nitraniline-2-sulphonic acid, 2-methoxyaniline-5-sulphonic acid, sulphanilic acid, 4-methoxyaniline-2-sulphonic acid, 2-naphthylamine-4:8-disulphonic acid, 5-chloro-4-methylaniline-6-sulphonic acid, metanilic acid, 4-methylaniline-2-sulphonic acid, orthanilic acid, 6-chloro-4-methyl-aniline-3-sulphonic acid, 2-naphthylamine-6:8-disulphonic acid, 2-naphthylamine-5:7-disulphonic acid, 6-chloro-4-aminotoluene-3-sulphonic acid, 6-chloro-3-aminotoluene-4-sulphonic acid, aniline-2:4-disulphonic acid, 6-nitro-3-amino benzoic acid, 4-nitro-4'-amino stilbene-2:2'-disulphonic acid, and p-anisidine, with an aromatic amine such as m-toluidine, aniline, orthoanisidine, 2:5-dimethoxyaniline, 1-naphthylamine-6-sulphonic acid, m-toluidine and anthranilic acid, and then diazotizing the resulting azoamine and coupling the diazonium salt with an amino naphthol such as 1-amino-8-naphthol-3:6-disulphonic acid, 1-amino-8-naphthol-4:6-disulphonic acid, 1-ethylamino-8-naphthol-3:6-disulphonic acid and 1-butyl amino-8-naphthol-3:6-disulphonic acid. Where the second amine has a grouping such as methoxy, hydroxy, carboxy, or carboxymethoxy in a position ortho to the attached azo group, metallized dyestuffs are possible, and, especially the copper complexes, are particularly valuable.

The above-described amino radicals become, in the subject dyestuffs, the -2-ylamino group on the mono- or di-halogeno triazine ring, as heretofore described. The formation of the amino-triazine substituted material may be simply visualized as reacting the (azo or anthraquinone) primary or secondary amino group compound with a di- or tri-halogeno triazine ring, with loss of hydrogen halide. This is in fact a frequently convenient method of preparation as described in the above-noted copending applications. However, the foregoing description is not to be construed as limiting the dystuffs which may be used in the practice of this invention to dyestuffs produced in such a fashion. Equally well, and as also described in the above-noted copending applications, the dyestuffs may be prepared by first forming a 2-ylamino-mono- or di-halogeno triazine and thereafter introducing an azo or anthraquinone chromophoric group by reaction with the existing 2-ylamino group or substituent thereon. It will be appreciated that this method still results in having an anthraquinone- or azo-amino radical as already described attached to the triazine ring at the 2-position.

It is also within the scope of this invention to have more than one triazin-2-ylamino group in the subject dyestuffs as where the azo or anthraquinone chromophoric group has two or more primary or secondary amino groups and these are each reacted with a di- or tri-halogeno triazine ring, either successively or simultaneously.

It is further within the scope of this invention to employ dyestuffs in the composition which have two azo- and/or anthraquinone-chromophoric groups substituted on a monohalogeno diaminotriazine ring. That is, the dyestuffs wherein a trihalogeno triazine (cyanuric trihalide) is reacted successively or simultaneously with two mols of the azo- or anthraquinone-amine, either the same or different. For ease of purification and isolation, if two different chromophoric groups attached to two different amino groups on the same triazine ring are desired, it is preferred to prepare such mono-C-halogeno-triazin-2:4-diylamino dyestuffs by first introducing one of the desired chromophoric-amino groups and then introducing the second chromophoric-amino group (again, either by the reaction of the azo- or anthraquinone amine with the C-halogeno triazine with loss of hydrogen halide, or by introduction of a chromophoric group by reaction with an existing triazinylamino structure, as for instance by azo-coupling reaction with a benzenoidamino group on the triazine ring).

However, it will be appreciated that while the immediately foregoing description, as well as that of the mentioned copending applications and the examples presented hereinafter, will advise those skilled in the art of the scope of the applicability of this invention, i.e. generally to any azo or anthraquinone dyestuff containing at least one solubilizing group and a primary or secondary amino group carrying as N-substituent a 1:3:5-triazine radical containing a halogen atom attached to a carbon atom of said triazine ring, and of the methods available for forming this dyestuff structure, the actual reaction scheme employed for bringing the organic radicals into interaction forms no part of the scope of this invention. On the other hand, it is a part of this invention to carry out such reaction in the presence of the stabilizer so that the latter is present during and after the formation and isolation of the dyestuff, as will be set forth more fully hereinafter.

DESCRIPTION OF THE TRIAZINE RING

The mono- or di-halogeno triazine ring forming a part of the subject dyestuffs which may be used in this invention must be clearly distinguished from trichlorocyanuric acid. The latter compound has the structure:

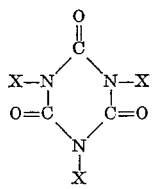

or

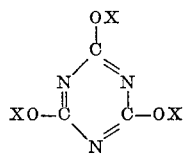

whereas cyanuric trichloride has the structure

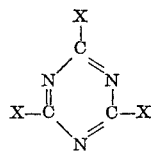

where X is halogen. Thus, in the present invention, the dyestuffs employed are those having the triazine ring (i.e. unsaturated with three conjugated double bonds) with the halogen atoms directly attached to a nuclear carbon atom.

At least one of the halogen atoms will be directly replaced by the azo or anthraquinone chromophoric group-containing amino radical. The monohalogeno dyestuffs may be formed by having two of the halogen atoms directly replaced by an azo or anthraquinone chromophoric group-containing amino radical. Alternatively, there may be used monohalogeno triazine dyestuffs having a single azo or anthraquinone chromophoric group-containing amino radical, with a second halogen atom directly replaced by a different radical. Such other radicals (which may be referred to as 4-position radicals, indicating the position of attachment to the triazine ring) may include alkyl groups such as methyl, ethyl, propyl, butyl, etc. (including straight and branched-chain radicals), aryl groups such as phenyl, or naphthyl, alkoxy groups such as methoxy, ethoxy, butoxy, aryloxy groups such as phenoxy, and cresyloxy, aralkyloxy groups such as benzyloxy, aralkyl, cycloalkyl, alkylmercapto such as methyl mercapto, arylmercapto such as phenylmercapto, amino, alkylamino, dialkylamino, arylamino, aralkylamino, cycloalkylamino, aralkyl, etc. A wide variety of radicals within each class may be used; for instance, suitable primary and secondary amines which may be used to introduce a non-halogeno 4-position radical include methylamine, butylamine, diethylamine, β-hydroxyethylamine, cyclohexylamine, aniline, β-naphthylamine, metanilic acid, 2-naphthylamine-6-sulphonic acid, 2-naphthylamine-4:8-disulphonic acid, 1-amino-8-naphthol-3:6-disulphonic acid, 2-amino-5-naphthol-7-sulphonic acid, 2-amino-8-naphthol-6-sulphonic acid, p-toluidine, m-anisidine, 2:4-dichloroaniline and also diamines such as ethylene diamine, p-phenylene diamine, 4:4′-diaminostilbene-2:2′-disulphonic acid and 2:4- and 2:5-diaminobenzene sulphonic acid, in addition to the above-noted azo or anthraquinone chromophoric group-containing amines.

In each instance, however, it will be remembered that there is at least one halogen, preferably chlorine or bromine, atom on the ring (i.e. the 6-position on the triazine ring always carries a halogen atom).

DESCRIPTION OF THE STABILIZING COMPONENT

In the novel stabilized composition provided by this invention, in addition to at least one of the dyestuffs above-described being present as the principal coloring matter, there is also present a stabilizer consisting essentially of a mixture of phosphate salts. This mixture is advantageously composed on the one hand of mono-sodium or mono-potassium phosphate salts and, on the other hand of dipotassium or disodium phosphate salt, but in general there may be used mixtures of mono- and di-alkali metal salts of phosphoric acid where the alkali metal is of Group IA of the periodic chart of the elements. As is well known, these salts may be mixed in proportions such that an aqueous solution thereof will have a buffered pH lying between 6 and 8. It is these phosphate salt mixtures which are employed in the composition of this invention (but not the mode of preparation of the phosphate salt mixture having the desired pH range which is within the ability of those skilled in the art).

DESCRIPTION OF THE STABILIZED DYESTUFF COMPOSITIONS

It has now been found that, when the subject class of dyestuffs are present in a composition stabilized by the above-described phosphate salt mixture, that the storage characteristics of such dyestuffs are vastly improved, and can, in fact, be kept for extended periods of time under normal temperature conditions whereas absent the phosphate stabilizing the dyestuffs would at least partially decompose, as already mentioned. Although the addition of even a trace of the phosphate salt mixture gives some improvement in storage stability of the dyestuffs, it is preferred to add between 1% and 25% of the phosphate salt mixture based on the weight of the dyestuff, although the preferred mixture for each particular dyestuff will vary according to the particular groupings attached to the carbon atoms of the triazine nucleus present in the dyestuffs. For instance, where a 4:6-dihalogenotriazinyl dyestuff is used, it is preferred to use a mixture of the phosphate salts which in aqueous solution will have a buffered pH lying between 6 and 7. For example, such a mixture would be one containing 7 parts of anhydrous disodium hydrogen phosphate and 12.5 parts of anhydrous potassium di-hydrogen phosphate.

In practice thereof, it has been found that the addition of 10% by weight of the phosphate salt mixture relative to the weight of the dyestuff present in the composition usually suffices to give adequate storage stability. The invention is, however, not to be understood as restricted to compositions containing at least this amount.

The phosphate salt mixture may be added to the reaction mixture in which the dyestuff is formed either before or during the reaction period, or it may be added after the reaction is completed but before the product is isolated. Where the reaction to prepare the dyestuff has been carried out in aqueous suspension or solution, the phosphate salt mixture may be added either in the solid state or in the form of an aqueous solution. When, during the isolation of the dyestuff, a filtration step is included and the separated solid is then washed on the filter with water or an aqueous solution to remove impurities, the phosphate mixture may conveniently be added to or dissolved in the water or aqueous solution used to wash the separated solid. Advantageously, when the phosphate mixture is added to an aqueous solution or suspension, such suspension or solution is made substantially neutral before addition of the phosphate mixture. Alternatively or additionally, the phosphate mixture may be added to the dyestuff after isolation. This is especially useful where the manufacture and isolation have been carried out under non-aqueous conditions. The phosphate mixture may be added to the dyestuffs after isolation thereof by mixing or milling together the dyestuff and the phosphate mixture, and if desired, there may be added other diluents which give neutral solution in water, for example urea and sodium sulphate, as may be used for example in the manufacture of dyestuff compositions of different tinctorial strengths.

In this latter connection, it will be understood that the preparatory process of the invention, as described hereinafter and in the above-mentioned copending applications, will frequently involve the isolation of the dyestuff proper in admixture with various inert diluents, and it is frequently preferred to add inert diluents such as common salt, Glauber's salt, or urea, to give a dyestuff powder containing a standard proportion of dyestuff. With the subject class of dyestuffs, it is convenient to limit them in compositions containing as little as perhaps 20% by weight of the dyestuff as such. The remainder of the composition may, if desired, consist entirely of the stabilizing phosphate salt mixture, or, more economically in many instances be composed of inert water-soluble solid diluents such as those mentioned above together with the desired quantity of buffer. Accordingly, this invention contemplates and embraces compositions containing as little as 20% by weight of the subject class of dyestuffs and as much as 80% of the stabilizing phosphate salt mixture, and there being present at least 1% based on the weight of the dyestuff, of the stabilizing phosphate salt mixture.

Such compositions containing any of the mono-(C-halogeno) - 1:3:5 - triazin - 2 - ylamino-azo chromophoric group-containing dyestuff or mono-(C-halogeno)-1:3:5-triazin - 2 - ylamino - anthraquinone chromophoric group-containing dyestuff or di(C-halogeno)-1:3:5-triazin-2-ylamino-azo chromophoric group-containing dyestuff or di-(C-halogeno)-1:3:5-triazin-2-ylamino - anthraquinone chromophoric group-containing dyestuff, and the above-described stabilizing phosphate salt mixture, exhibit the improved storage characteristic advantages provided by this invention. These advantages are particularly well exhibited with the compositions containing the di-(C-halogeno)-1:3:5-triazin-2-ylamino-azo and anthraquinone chromophoric group-containing dyestuffs where the storage problem is somewhat more severe than with the mono-halogeno dyestuffs.

It is of interest that the action of the stabilizing phosphate salt mixture, which is a composition having a buffering characteristic appears to involve something more than mere buffering activity in that other known buffers, which are effective buffers within the pH range of say from 6 to 8, fail to stabilize the subject class of dyestuffs when incorporated in a composition in the same manner as that employed in this invention. In fact, some of these other buffers actually seem to catalyze the decomposition of the dyestuffs.

EXAMPLES OF THE INVENTION

To further describe and explain this invention, the examples following hereinafter will illustrate typical preparations for the dyestuffs and the dyestuff compositions containing the stabilizing phosphate salt mixture.

*Example 1*

A mixture of 31.9 parts of 1-amino-8-naphthol-3:6-disulphonic acid and 160 parts of water is stirred and sodium carbonate is added until a clear solution which reacts alkaline to Brilliant Yellow paper is formed. This solution is added in 30 minutes at a temperature between 0° C. and 5° C. to a stirred suspension of cyanuric chloride formed by pouring a solution of 18.6 parts of cyanuric chloride in 100 parts of acetone into a mixture of 200 parts of water, and 300 parts of crushed ice and 0.5 part of aqueous hydrochloric acid of specific gravity 1.18. The mixture is stirred for 30 minutes and there is then added a solution of benzene diazonium chloride obtained by dissolving 8.8 parts of aniline in 160 parts of water and 26.8 parts of aqueous hydrochloric acid of specific gravity 1.18, cooling the resultant solution to 0° C. and adding 6.56 parts of sodium nitrite. Sodium carbonate is then added carefully until the aqueous medium no longer reacts acid to Congo red paper and then 100 parts of sodium chloride are added. In order to complete the coupling more soda ash is added gradually to raise the pH of the aqueous medium finally to about 7.7.

When no diazobenzene can be detected in the mixture, there is added to it a solution containing 7 parts of anhydrous disodium hydrogen phosphate and 12.5 parts of anhydrous potassium dihydrogen phosphate in 100 parts of water and after stirring for another 15 minutes, the mixture is filtered off. The residue is drained, mixed intimately with 4 parts of anhydrous disodium hydrogen phosphate and 7.2 parts of anhydrous potassium dihydrogen phosphate and dried at 40–45° C. A portion of the dyestuff so obtained is analyzed immediately after isolation. The remainder is kept in a glass-stoppered bottle for 12 months and then a second portion is analyzed. Less than 1% of the reactive chlorine attached to the triazine nucleus has been hydrolyzed.

*Example 2*

57.1 parts of the trisodium salt of the aminoazo compound obtained by coupling diazotized metanilic acid with 1-acetylamino-8-naphthol-3:6-disulphonic acid in aqueous acid in the presence of sodium carbonate and hydrolyzing the product so formed by heating with dilute caustic soda solution are dissolved in 800 parts of water at 20° C. The solution is added during 50 minutes to a stirred suspension formed by pouring a solution of 18.6 parts of cyanuric chloride in 100 parts of acetone into 400 parts of water and 600 parts of crushed ice. The mixture is stirred at a temperature below 4° C. After 1 hour, sodium carbonate is gradually added to make the medium neutral to litmus. After another 30 minutes, sodium chloride is added at the rate of 15 lbs. for every 10 gallons of mixture and the product precipitated is filtered off, washed with 15% brine solution and dried at 30° C. 3 parts of the dyestuff so obtained are thoroughly mixed with 0.7 part of anhydrous disodium hydrogen phosphate and 1.25 parts of anhydrous potassium dihydrogen phosphate and this mixture and the remainder of the dyestuff are stored for 28 months and portions of each are analyzed.

It is found that only 3% of the reactive chlorine originally attached to the triazine nucleus has been removed in the buffered sample but that 66% of the chlorine originally attached to the triazine nucleus has been removed in the unbuffered sample.

*Example 3*

A solution containing the primary condensation product of cyanuric chloride and the disodium salt of 1-amino-8-hydroxy-naphthalene 3:6-disulphonic acid is obtained as described in Example 1. The solution is stirred for 30 minutes and there is then added a solution of the diazo compound from 14.25 parts of p-aminoacetanilide. Sodium carbonate is gradually added to the mixture in sufficient amount to make the medium slightly alkaline to litmus and to keep it so during the next 6 hours. Salt is then added at the rate of 12 lbs. for each 10 gallons of mixture and the product precipitated is then filtered off, slurried with 400 parts of acetone, refiltered, and then dried at 30° C. A mixture of 3 parts of the dried dyestuff, 0.7 part of anhydrous disodium hydrogen phosphate and 1.25 parts of anhydrous potassium dihydrogen phosphate is made and this mixture and the remainder of the dyestuff are stored for 28 months.

It is found that only 6% of the reactive chlorine originally attached to the triazine nucleus in the buffered sample has been removed, but that 98% of the chlorine originally attached to the triazine nucleus in the unbuffered sample has been removed.

*Example 4*

39.2 parts of 2-chloro-4-anilino-6(3'-amino-4'-sulphoanilino)-s-triazine are stirred with 600 parts of water and sufficient sodium carbonate is added to the mixture to make it neutral to litmus. 30 parts of 10N hydrochloric acid are then added and the temperature is adjusted between 15° C. and 20° C. An aqueous solution of sodium nitrate is gradually added until a slight excess is present 5 minutes after the last addition. A solution containing 30 parts of sodium acetate crystals in 160 parts of water is then added. The mixture is then added over a period of 30 minutes to a solution containing 21.5 parts of 1-(2'-chlorophenyl)-3-methyl-5-pyrazolone in 200 parts of water made just alkaline to Clayton Yellow paper by addition of caustic soda. The mixture is stirred for 18 hours at a temperature between 10° C. and 15° C. and then the precipitated product is filtered off, mixed thoroughly with 4 parts of anhydrous disodium hydrogen phosphate and 7.5 parts of anhydrous potassium dihydrogen phosphate and then dried at 30° C. to give a yellow powder. The product is stored for 7 months at atmospheric temperature. Less than 1% of the chlorine originally attached to the triazine nucleus is removed.

*Example 5*

A solution of 5.0 parts of cyanuric chloride in 24 parts of acetone is poured gradually into a stirred mixture of 100 parts of water and 100 parts of crushed ice. To the suspension of cyanuric chloride so obtained, a solution of 14.8 parts of the disodium salt of 1-β-sulphatoisopropylamino-4-(4' - aminoanilino) - anthraquinone - 3'- sulphonic acid is 300 parts of water is added during 1 hour, the temperature of the reaction mixture being maintained between 0° C. and 2° C. during the addition. The mixture is then stirred at this temperature for 1 hour during which time sufficient 10% aqueous sodium carbonate solution is added to maintain the reaction mixture neutral to litmus. A solution of 6 parts of anhydrous disodium hydrogen phosphate and 12 parts anhydrous potassium dihydrogen phosphate in 100 parts of water is added to the mixture and then sufficient sodium chloride is added at the rate of 18 lbs. for each 10 gallons of solution. The mixture is warmed to 15° C. and stirred until precipitation of the dyestuff is complete and is then filtered. The dyestuff is washed on the filter with a solution of 20 parts of sodium chloride, 1.5 parts of anhydrous disodium hydrogen phosphate and 3 parts of anhydrous potassium dihydrogen phosphate in 100 parts of water, drained well, mixed thoroughly with 1 part of anhydrous disodium hydrogen phosphate and 2 parts of anhydrous potassium dihydrogen phosphate and dried at atmospheric temperature.

*Example 6*

32 parts of cyanuric bromide are dissolved in 280 parts of dioxan at 65° C. The solution is poured into a stirred mixture of 200 parts of water and 320 parts of crushed ice and to the suspension of cyanuric bromide so formed there is added during 40 minutes a solution containing 60.3 parts of the trisodium salt of 1-amino-2:3':5 - trisulpho - 4-(4'-aminoanilino)-anthraquinone in 1200 parts of water. The mixture is stirred at a temperature below 5° C. for 5 hours. During this period, sodium carbonate solution is added to the reaction mixture from time to time to keep it neutral to litmus. A solution containing 4.3 parts of anhydrous disodium hydrogen phosphate and 7.7 parts anhydrous potassium dihydrogen phosphate in 60 parts of water is added. 40 parts of sodium chloride are then added and the mixture is stirred for 30 minutes. The precipitated blue dyestuff is filtered off, washed on the filter with 20% brine solution and drained well. The paste is mixed thoroughly with 4.3 parts of anhydrous disodium hydrogen phosphate and 7.7 parts of anhydrous potassium dihydrogen phosphate and dried at 30° C.

*Example 7*

A solution of 8.35 parts of cyanuric chloride in 40 parts of acetone is added gradually to a stirred mixture of 170 parts of water and 170 parts of crushed ice. The suspension of cyanuric chloride so obtained is stirred at a temperature between 0° C. and 4° C. and a solution of 22.2 parts of the disodium salt of 1-amino-4-(4'-aminoanilino)-anthra-quinone-2:3'-disulphonic acid in 500 parts of water is added during 1½ hours. The mixture is stirred for a further 45 minutes and then sufficient 10% sodium carbonate solution is added gradually to render the reaction mixture neutral to litmus. Sufficient sodium chloride is then added to give a concentration of 100 grams per liter of solution, and the mixture is stirred until separation of the dyestuff is complete and it is then filtered. The solid residue is washed with a 10% solution of sodium chloride in water, dried at atmospheric temperature and finally mixed intimately with a powdered mixture of 11.4 parts of anhydrous disodium hydrogen phosphate and 7.2 parts of anhydrous potassium dihydrogen phosphate.

This dyestuff composition on storage for approximately 12 months in a stoppered bottle at ordinary temperature was found to have lost only 3.7% of its hydrolyzable chlorine content; a similar preparation containing no buffer lost approximately 50% of its hydrolyzable chlorine content.

*Example 8*

A solution of 5 parts of cyanuric chloride in 24 parts of acetone is added gradually to a stirred mixture of 100 parts of water and 100 parts of crushed ice. The suspension of cyanuric chloride so obtained is stirred at a temperature between 0° C. and 4° C. and a solution of 13.33 parts of the disodium salt of 1-amino-4-(3'-aminoanilino)-anthraquinone-2:4'-disulphonic acid in 300 parts of water is added over 1 hour. The mixture is stirred for a further 1 hour and then sufficient 10% sodium carbonate solution is added gradually to render the reaction mixture neutral to litmus. A solution of 6 parts of anhydrous disodium hydrogen phosphate and 12 parts of anhydrous potassium dihydrogen phosphate in 100 parts of water is added to the mixture, and after stirring for 10 minutes sufficient sodium chloride is added to give a concentration of 200 grams per liter of solution. The mixture is stirred for 1 hour and is then filtered. The solid residue is washed with a solution of 80 parts of sodium chloride, 6 parts of anhydrous disodium hydrogen phosphate and 12 parts of anhydrous potassium dihydrogen phosphate in 400 parts of water and is dried at atmospheric temperature. The dyestuff so obtained is mixed intimately with a mixture of 1 part of anhydrous disodium hydrogen phosphate and 2 parts of anhydrous potassium dihydrogen phosphate.

*Example 9*

A solution of 3.88 parts of cyanuric chloride in 20 parts of acetone is added gradually to a stirred mixture of 60 parts of water and 60 parts of crushed ice. To the suspension of cyanuric chloride so obtained there is added during 1 hour, a solution of 11.26 parts of the disodium salt of 1-amino-4-(3'-amino-6'-methyl)-anilinoanthraquinone-2:4'-disulphonic acid in 300 parts of water, the temperature of the reaction mixture being maintained between 0° C. and 3° C. during the addition. The mixture is then stirred for 3 hours at 4° C. to 7° C. during which time it is initially made neutral to litmus by the gradual addition of 10% sodium carbonate solution and subsequently maintained neutral by periodic addition of 10% sodium bicarbonate solution. Sufficient sodium chloride is then added to give a concentration of 140 grams per liter and, after stirring for about 30 minutes, a solution of 4 parts of anhydrous disodium hydrogen phosphate and 8 parts of anhydrous potassium dihydrogen phosphate in 50 parts of water is added. Sodium chloride equivalent to a concentration of 40 grams per liter is added to assist aggregation and complete precipitation and, after stirring at 25° C. for 30 minutes, the mixture is filtered; the product on the filter is washed with a solution of 40 parts of sodium chloride, 3 parts of anhydrous disodium hydrogen phosphate and 6 parts of anhydrous potassium dihydrogen phosphate in 200 parts of water and finally dried at room temperature.

*Example 10*

A solution of 4.84 parts of cyanuric chloride in 24 parts of acetone is added gradually to a stirred mixture of 100 parts of crushed ice. To the suspension of cyanuric chloride so obtained there is added during 45 minutes a solution of 13.68 parts of the disodium salt of 1-amino-4-(3'-amino-2'-methyl) - anilinoanthraquinone-2:5'-disulphonic acid in 250 parts of water, the temperature of the reaction mixture being maintained between 0° C. and 3° C. during the addition. The mixture is then stirred for 2 hours at the same temperature during which time it is made and maintained neutral to litmus by the gradual addition of 10% sodium carbonate solution. The temperature is raised to about 20° C., a solution of 3 parts of anhydrous disodium hydrogen phosphate and 6 parts of anhydrous potassium dihydrogen phosphate in 40 parts of water is added and then sufficient sodium chloride is added to give a concentration of 100 grams per liter. The mixture is stirred until separation of the dyestuff is complete and is then filtered. The dyestuff on the filter is washed with a solution of 20 parts of sodium chloride, 3 parts of anhydrous disodium hydrogen phosphate and 6 parts of anhydrous potassium dihydrogen phosphate in 200 parts of water and finally dried at room temperature.

*Example 11*

32.0 parts of cyanuric bromide are dissolved in 280 parts of dioxan at 65° C. and the solution so formed is added to a stirred mixture of 200 parts of water and 360 parts of crushed ice. There is then added to the suspension so formed in 45 minutes a solution containing 50.6 parts of the disodium salt of 1-amino-4-(3'-aminoanilino)-anthraquinone - 2:4' - disulphonic acid in 1000 parts of water and the mixture is stirred at a temperature below 6° C. for 1½ hours and then neutralized to litmus by careful addition of sodium carbonate solution. During the next 16 hours, the temperature is still kept below 6° C. and further small amounts of sodium carbonate solution are added as necessary to keep the aqueous reaction medium neutral to litmus. Salt is then added to give a concentration of 250 grams per liter of volume and after a short time the product precipitated thereby is filtered off, drained well, slurried with acetone, refiltered and washed on the filter with acetone. The filter cake so obtained is mixed with 12 parts of a mixture containing anhydrous potassium dihydrogen phosphate and anhydrous disodium hydrogen phosphate in the proportions of 125 to 70 and then dried at 30° C. Analysis shows that the isolated dyestuff contains 1.85 reactive bromine atoms in each molecule. When it is applied to cotton by the printing and dyeing processes described above, reddish-blue shades having very good fastness to wet treatments and to light are produced.

*Example 12*

A solution of the diazo compound from 27.3 parts of the sodium salt of 2-amino-4-sulphodiphenylether is added to a solution containing the primary condensation product of cyanuric chloride and the disodium salt of 1-amino-8-hydroxynaphthalene-3:6-disulphanic acid prepared as described in Example 2 and the temperature of the mixture is kept below 5° C. Sodium carbonate is added gradually to raise the pH of the aqueous medium to 7 to 7.5 and keep it within this range until coupling is complete. This takes about 3 hours. Salt is then added to the mixture at the rate of 5 lbs. for each 10 gallons of mixture and then a solution of 4.2 parts of anhydrous disodium hydrogen phosphate and 7.5 parts of anhydrous potassium dihydrogen phosphate in 50 parts of water is added. After stirring the mixture for a short time, the precipitated product is filtered off, mixed with 4.2 parts of anhydrous disodium hydrogen phosphate and 7.5 parts of anhydrous potassium dihydrogen phosphate and dried at 30° C. After 18 months storage at ordinary temperature, the product so obtained has only lost 6% of the chlorine originally attached to the triazine nucleus.

If, in this example, the 27.3 parts of the sodium salt of 2-amino-4-sulphodiphenyl ether are replaced by 28.6 parts of the sodium salt of 2-amino-3'-methyl-4-sulphodiphenyl ether then a similar dyestuff is obtained. After it has been stored at atmospheric temperature for 17 months, only 6% of the chlorine originally attached to the triazine nucleus has been removed.

Additional teachings of suitable dyestuffs for use in the present invention, and further teachings of the methods of making the same may be found in, for example, U.S. Patents No. 1,667,312, 1,704,637, 1,779,398, 1,867,451, 2,270,478, and 2,399,066, and British Patent No. 467,815.

As further examples of the compositions and advantages of this invention, Table 1, following, illustrates the typical superior storage characteristics achieved. In this table, the dyestuff obtained by coupling diazotized 2-naphthylamine-4:8-disulphonic acid with m-toluidine and condensing with one molecular proportion of cyanuric chloride was stablized with various amounts of stabilizers which consisted essentially of mixtures of disodium hydrogen phosphate and potassium dihydrogen phosphate at various pH's. The samples were stored at 60° C. in stoppered containers for 48 hours and then at 80° C. for 24 hours. The samples were analyzed and the following Table 1 summarizes the results. In column I is given composition of stabilizer as ratio of $Na_2HPO_4$ to $KH_2PO_4$, in column II is given initial pH of the mixture, in column III is given amount of stabilizer as a percentage of the total composition, and in column IV is given loss in hydrolyzable chlorine as a percentage of the initial figure.

TABLE 1

| I | II | III | IV |
|---|---|---|---|
|  |  | Percent | Percent |
| ------- | 7.0 | 0 | 56.2 |
| 1:7.85 | 6.00 | 80 | 9.75 |
| 1:7.85 | 6.00 | 50 | 11.3 |
| 1:1.8 | 7.00 | 10 | 7.2 |
| 20:1 | 8.00 | 3 | 11.3 |
| 20:1 | 8.00 | 1 | 7.2 |

The extended storage life of the subject dyestuffs as stabilized in compositions according to the present invention, Table 2 shows a comparison of two other dyestuffs which were stored for one year at 20° C. both as stabilized and as unstabilized samples. Dyestuff (1) is obtained by coupling diazotized 5-amino-4-sulphoacetanilide with 1 - (2':5' - dichloro-4-sulphophenyl)-3-methyl-5-pyrazolone, hydrolyzing off the acetyl group and condensing the resultant aminoazo compound with one molecular proportion of cyanuric chloride. Dyestuff (2) is obtained by coupling diazotized aniline-2:5-disulphonic acid with 1-(3'-aminophenyl)-3-methyl-5-pyrazolone and condensing the aminoazo compound obtained with one molecular proportion of cyanuric chloride. The second column gives the composition of the stabilizer expressed as a ratio of $Na_2HPO_4$ to $KH_2PO_4$. The third column gives the amount of stabilizer expressed as a percentage of the total composition and the last column gives the amount of the reactive chlorine which has been lost expressed as a percentage of the initial figure.

TABLE 2

| Dyestuff | I | II | III |
|---|---|---|---|
| (1) | 1:1.77 | 10.0 | Percent 0 |
| (1) | ------ | 0 | 16 |
| (2) | 1-1.77 | 15.0 | 3.0 |
| (2) | ------ | 0 | 94 |

The following Table 3 gives a number of further examples of azo and anthraquinone dyestuffs which have been compounded as stabilized compositions exhibiting similar advantageous storage characteristics. In the first column is given the name or where this is unduly complicated the method of manufacture of the dyestuff. In the second column is given the composition of the buffer expressed as a ratio of $Na_2HPO_4$ to $KH_2PO_4$ by weight. In the third column is given the amount of buffer expressed as a percentage of the total weight of the dyestuff composition.

TABLE 3

| | I | II | III |
|---|---|---|---|
| 1 | 1-chloro-2-(dichlorotriazinylamino)-5-hydroxy-6-(2'-sulphophenylazo)naphthalene-7-sulphonic acid. | 1:1.85 | 13.6 |
| 2 | 2-(dichlorotriazinylamino)-5-hydroxy-6-(4'-methoxy-2'-sulphophenylazo)naphthalene-7-sulphonic acid. | 1:1.85 | 11.7 |
| 3 | 2-(dichloro-triazin-N-methylamino)-5-hydroxy-6-(2'-sulphophenylazo)naphthalene-6-sulphonic acid. | 1:1.85 | 11.7 |
| 4 | 2-(4'-dichlorotriazinylamino-2'-acetyl-aminophenylazo)naphthalene-5:7-disulphonic acid. | 1:1.77 | 9.7 |
| 5 | 4-dichlorotriazinylamino-1:2'-azonaphthalene 4':7:8'-trisulphonic acid. | 1:1.77 | 5.0 |
| 6 | 2-(4'-dichlorotriazinylamino-2'-methylphenylazo)naphthalene-5:7-disulphonic acid. | 1:1.78 | 12.0 |
| 7 | 1-(4'-sulphophenyl)-3-carboxy-4-(4''-dichlorotriazinylamino-2''-sulphophenylazo)-5-pyrazolone. | 1:1.78 | 9.3 |
| 8 | 1-(2':5'-dichloro-4'-sulphophenyl)-3-carboxy-4-(5''-dichlorotriazinylamino-2''-sulphophenylazo)-5-pyrazolone. | 1:1.77 | 6.3 |
| 9 | 1(2':5'-dichloro-4'-sulphophenyl)-3-carboxy-4-(3''-dichlorotriazinylaminophenylazo)-5-pyrazolone. | 1:1.77 | 11.1 |
| 10 | 1-(3'-dichlorotriazinylaminophenyl)-3-methyl-4-(1'':5''-disulpho-2''-naphthylazo)-5-pyrazolone. | 1:1.77 | 15.3 |
| 11 | The dyestuff obtained by coupling diazotised 4-amino-4'-(7''-sulphonaphtha (1:2:4:5) triazolyl-2''-)stilbene-2:2'-disulphonic acid with 1-(3'-aminophenyl)-3-methyl-5-pyrazolone and condensing the aminoazo compound so obtained with one molecular proportion of cyanuric chloride. X | 1:1.77 | 5.0 |
| 12 | 2-(dichlorotriazin-N-methylamino)-8-hydroxy-7-(2''-sulphophenylazo)naphthalene-6-sulphonic acid. | 1:1.77 | 12.8 |
| 13 | 2-(dichlorotriazin-N-methylamino)-8-hydroxy-7-(5''-methyl-2''-methoxy-4''-(6''':8'''-disulpho-2'''-naphthylazo)phenylazo)naphthalene-6-sulphonic acid. | 1:1.77 | 12.2 |
| 14 | The dyestuff obtained by coupling diazotised dehydrothio-p-toluidine sulphonic acid under alkaline conditions with 2-(dichlorotriazin-N-methylamino)-8-hydroxy-naphthalene-6-sulphonic acid. | 1:1.77 | 10.3 |
| 15 | 2-(dichlorotriazin-N-methylamino)-8-hydroxy-7-(4''-methoxy-2''-sulphophenylazo)naphthalene-6-sulphonic acid. | 1:1.78 | 12.2 |
| 16 | 2-(dichlorotriazinylamino)-8-hydroxy-7-(2''-sulphophenylazo)naphthalene-6-sulphonic acid. | 1:1.78 | 10.5 |
| 17 | 2-(dichlorotriazinylamino)-8-hydroxy-7-(1'':5''-disulpho-2''-naphthylazo)naphthalene-6-sulphonic acid. | 1:1.77 | 12.1 |
| 18 | 2-(dichlorotriazinylamino)-8-hydroxy-7-(3'-methoxy-5'-sulphophenylazo)naphthalene-6-sulphonic acid. | 1:1.77 | 10.0 |
| 19 | 2-(dichlorotriazinylamino)-8-hydroxy-3-carboxy-7-(2'-sulphophenylazo)naphthalene-6-sulphonic acid. | 1:1.77 | 15.0 |
| 20 | 1-dichlorotriazin-N-methylamino-5-hydroxy-6-(2'-sulphophenylazo)naphthalene-7-sulphonic acid. | 1:1.77 | 10.0 |
| 21 | 1-(3'-dichlorotriazinylaminobenzoylamino)-8-hydroxy-7-(2'-sulphophenylazo)naphthalene-3:6-disulphonic acid. | 1:1.77 | 10.0 |
| 22 | 1-(3'-dichlorotriazinylaminobenzoylamino)-8-hydroxy-7-(2'''-sulphophenylazo)naphthalene-6-sulphonic acid. | 1:1.77 | 9.0 |
| 23 | 1-dichlorotriazin-N-ethylamino-8-hydroxy-7-(4'-methoxy-2'-sulphophenylazo)naphthalene 3:6-disulphonic acid. | 1:1.77 | 8.8 |
| 24 | 1-(dichlorotriazin-N-ethylamino)-8-hydroxy-7-(4'-methoxyphenylazo)naphthalene-3:6-disulphonic acid. | 1:1.77 | 9.4 |

TABLE 3—Continued

| | I | II | III |
|---|---|---|---|
| 25 | 1-(3'-dichlorotriazin-N-ethylamino)-8-hydroxy-7-(5'-sulphamyl-1'-naphthylazo)naphthalene-3:6-disulphonic acid. | 1:1.77 | 13.3 |
| 26 | 1-(dichlorotriazin-N-butylamino)-8-hydroxy-2':7-azonaphthalene-1':3:6-trisulphonic acid. | 1:1.77 | 10.0 |
| 27 | 4-chloro-4'-(4''-dichlorotriazinylaminophenylazo)stilbene-2:2'-disulphonic acid. | 1:1.77 | 5.0 |
| 28 | 4-chloro-4'-(2''-methyl-4''-dichlorotriazinylaminophenylazo)stilbene-2:2'-disulphonic acid. | 1:1.77 | 4.0 |
| 29 | 4-chloro-4'-(4''-dichlorotriazin-N-methylaminophenylazo)stilbene-2:2'-disulphonic acid. | 1:1.77 / 1:1.77 | 6.0 |
| 30 | 4-bromo-4'-(2''-methyl-4''-dichlorotriazinylaminophenylazo)stilbene-2:2'-disulphonic acid. | 1:1.77 | 5.0 |
| 31 | 4-nitro-4'-(2''-methyl-5''-methoxy-4''-dichlorotriazinylaminophenylazo)stilbene-2:2'-disulphonic acid. | 1:1.77 | 4.5 |
| 32 | 4-nitro-4'-(4''-dichlorotriazinylamino-7''-sulpho-1''-naphthylazo(stilbene-2:2'-disulphonic acid. | 1:1.77 | 2.0 |
| 33 | 4-nitro-4'-(4''-dichlorotriazinylaminophenylazo)stilbene-2:2'-disulphonic acid. | 1:1.77 | 13.2 |
| 34 | 4-(4''-methoxyphenylazo)4'-dichlorotriazinylaminostilbene-2:2'-disulphonic acid. | 1:1.77 | 14.4 |
| 35 | 4-acetylamino-4'-(4''-dichlorotriazinylaminophenylazo)stilbene-2:2'-disulphonic acid. | 1:1.77 | 4.0 |
| 36 | 4-dimethylamino,4'-(2''-methyl-4''-dichlorotriazinylaminophenylazo)stilbene-2:2'-disulphonic acid. | 1:1.77 | 2.0 |
| 37 | 4-(7''-sulpho-2''-naphtha(1:2:4:5)triazolyl)-4'-(4'''-dichlorotriazinylaminophenylazo)stilbene-2:2'-disulphonic acid. | 1:1.77 | 3.0 |
| 38 | The dyestuff obtained by coupling diazotised 4-amino-4',(7''-sulphonaphtha(1:2:4:5)triazolyl)-stilbene-2:2'-disulphonic acid with 4-(3'-methyl-1'-pyrazol(5')-onyl-4'-dichlorotriazinylamino stilbene-2:2'-disulphonic acid. | 1:1.77 | 4.5 |
| 39 | 2-dibromotriazinylamino-5-hydroxy-6-(2'-sulphophenylazo)naphthalene-7-sulphonic acid. | 1:1.77 | 24.0 |
| 40 | 2-dibromotriazin-N-methylamino-8-hydroxy-7-(2'-sulphophenylazo)naphthalene-6-sulphonic acid. | 1:1.77 | 10.6 |
| 41 | 1-dibromotriazinylamino-8-hydroxy-7-(2'-sulphophenylazo)naphthalene-3:6-disulphonic acid. | 1:1.77 | 16.4 |
| 42 | 1:8-dihydroxy-2-(4'-dichlorotriazinylamino-2'-sulphophenylazo)naphthalene-3:6-disulphonic acid. | 1:1.77 | 10.2 |
| 43 | 2-hydroxy-1-(4'-dichlorotriazinylamino-2'-sulphophenylazo)naphthalene-6:8-disulphonic acid. | 1:1.77 | 11.0 |
| 44 | 1-phenylamino-8-hydroxy-7-(4'-dichlorotriazinylamino-2'-sulphophenylazo)naphthalene-3:6-disulphonic acid. | 1:1.77 | 18.4 |
| 45 | 1-benzoylamino-8-hydroxy-7-(4'-triazinylamino-2'-sulphophenylazo)naphthalene-3:6-disulphonic acid. | 1:1.77 | 7.6 |
| 46 | 2-acetylamino-5-hydroxy-6-(4'-dichlorotriazinylamino-2'-sulphophenylazo)naphthalene-7-sulphonic acid. | 1:1.77 | 14.0 |
| 47 | 1-benzoylamino-8-hydroxy-7-(5'-dichlorotriazinylamino-2'-sulphophenylazo)naphthalene-3:6-disulphonic acid. | 1:1.77 | 8.0 |
| 48 | 1-acetylamino-8-hydroxy-7-(5'-dichlorotriazinylamino-2'-sulphophenylazo)naphthalene-3:6-disulphonic acid. | 1:1.77 | 14.0 |
| 49 | 8-dichlorotriazinylamino-1-hydroxy-2:2'-azonaphthalene-1':3:6-trisulphonic acid. | 1:1.77 | 10.0 |
| 50 | The copper complex of 2-dichlorotriazinylamino-5-hydroxy-6-(2'-hydroxy-5'-sulphophenylazo)naphthalene-7-sulphonic acid. | 1:1.77 | 10.7 |
| 51 | The copper complex of 1-dichlorotriazinylamino-5-hydroxy-6-(2'-hydroxy-5'-sulphophenylazo)naphthalene-7-sulphonic acid. | 1:1.77 | 19.2 |
| 52 | The copper complex of 1-dichlorotriazinylamino-8-hydroxy-7-(2'-hydroxy-5'-ethanesulphonylphenylazo)naphthalene-3:6-disulphonic acid. | 1:1.77 | 10.0 |
| 53 | The copper complex of 1-dichlorotriazinylamino-8-hydroxy-7-(2'-hydroxy-3':5'-disulphophenylazo)naphthalene-4-sulphonic acid. | 1:1.77 | 9.5 |
| 54 | The copper complex of 2-dichlorotriazinylamino-8-hydroxy-7-(2'-hydroxy-5'-sulphamylphenylazo)naphthalene-6-sulphonic acid. | 1:1.77 | 10.0 |
| 55 | The copper complex of 2-dichlorotriazinylamino-5-hydroxy-6-(2'-hydroxy-5'-sulphophenylzao)naphthalene-1:7-disulphonic acid. | 1:1.77 | 10.0 |
| 56 | The copper complex of 1-dichlorotriazinylamino-8-hydroxy-7-(2'-hydroxy-5'-sulphophenylazo)naphthalene-3:6-disulphonic acid. | 1:1.77 | 10.0 |
| 57 | The copper complex of 1-dichlorotriazinyl-amino-8-hydroxy-7-(2'-hydroxy-4'-(2''-sulphophenylazo)phenylazo)naphthalene-3:6-disulphonic acid. | 1:1.77 | 14.2 |
| 58 | 1-dichlorotriazinylamino-8-hydroxy-7-(2'-methoxy-5'-methyl-4'-(2''-sulphophenylazo)phenylazo)naphthalene-3:6-disulphonic acid. | 1:1.77 | 6.0 |
| 59 | 1-dichlorotriazinylamino-8-hydroxy-7-(2'-methoxy-5'-methyl-4'-(4'':8'-disulpho-2''-naphthylazo)phenylazo)naphthalene-3:6-disulphonic acid. | 1:1.77 | 5.5 |
| 60 | 2-(2'-acetylamino-4'-dichlorotriazinylaminophenylazo)naphthalene-4:8-disulphonic acid. | 1:1.77 | 10.0 |
| 61 | 6-dichloro-triazin-N-methylamino-1-hydroxy-2:2'-azonaphthalene-1':3:5'-trisulphonic acid. | 1:1.77 | 11.0 |
| 62 | 6-dichlorotriazinylamino-1-hydroxy-2:2'-azonaphthalene-1':3:5:5'-tetrasulphonic acid. | 1:1.77 | 12.0 |

TABLE 3—Continued

| | I | II | III |
|---|---|---|---|
| 63 | The 1:2 chromium complex of 2-dichlorotriazinylamino-5-hydroxy-6-(2'-carboxyphenylazo)naphthalene-7-sulphonic acid. | 1:1.77 | 10.0 |
| 64 | 1:2 cobalt complex of 2-dichlorotriazinylamino-5-hydroxy-6-(2'-hydroxy-3'-nitro-5'-sulphophenylazo)naphthalene-7-sulphonic acid. | 1:1.77 | 10.0 |
| 65 | 1:2 chromium complex of 1-dichlorotriazinylamino-8-hydroxy-7-(2'-hydroxy-5'-nitrophenylazo)naphthalene-3:6-disulphonic acid. | 1:1.77 | 10.0 |
| 66 | 1-amino-2-sulpho-4-dichlorotriazinylaminoanthraquinone. | 1:2 | 10.0 |
| 67 | 1-(4'-dichlorotriazinylamino)phenylaminoanthraquinone-2:3'-disulphonic acid. | 1:2 | 10.0 |
| 68 | 1-amino-2-sulphatoethoxy-4-(3'-dichlorotriazinylamino-4'-sulphophenylamino)anthraquinone. | 1:2 | 10.0 |
| 69 | 1-cyclohexylamino-4-(4'-dichlorotriazinylaminophenylamino)anthraquinone-3':6-disulphonic acid. | 1:2 | 10.0 |
| 70 | 1:4-bis(3'-dichlorotriazinylamino-4'-sulphophenylamino)anthraquinone. | 1:2 | 10.0 |
| 71 | 9.(4'-dichlorotriazinylamino-2'-sulphophenyl)3':4'-phthaloylacridone-10-sulphonic acid. | 1:2 | 10.0 |
| 72 | 2-(2'-hydroxy-5'-sulphophenyl)-6-(4''-dichlorotriazinylamino-3''-sulphophenylamino)-1:9-anthrapyrimidine. | 1:2 | 10.0 |

It will be apparent that within the principles disclosed above this invention may be practiced according to various specific dyestuffs and compositions, including those specifically shown as well as others which will be obvious to one skilled in the art reading this disclosure. Accordingly, our invention is limited only by the spirit and scope of the following claims.

We claim:

1. Solid dyestuff compositions containing as the principal coloring matter the substantially neutral alkali metal salt of a dyestuff selected from the class consisting of azo and anthraquinone dyestuffs containing at least one ionogenic solubilizing group and an amino group selected from the class consisting of primary and secondary amino groups carrying as N-substituents a 1:3:5-triazine radical containing two halogens, selected from the group consisting of chlorine and bromine atoms attached to the carbon atoms of said triazine ring, and a stabilizer for said dyestuff consisting essentially of a mixture of water-soluble alkali metal salts of phosphoric acid, which mixture has an aqueous solution a pH of from 6 to 8, wherein said alkali metal is selected from the group consisting of sodium and potassium.

2. The composition of claim 1, wherein said composition also contains an inert diluent in addition to said dyestuff and said mixture of water-soluble phosphate salts.

3. The composition of claim 1, wherein said dyestuff is an azo dyestuff and said 1:3:5-triazine radical carries two halogen atoms attached to the carbon atoms of the triazine ring.

4. The composition of claim 1, wherein said dyestuff is an anthraquinone dyestuff and said 1:3:5-triazine radical carries two halogen atoms attached to the carbon atoms of the triazine ring.

References Cited in the file of this patent

UNITED STATES PATENTS 2,167,804 Gubler et al. Aug. 1, 1939
2,361,301 Libby et al. Oct. 24, 1944

OTHER REFERENCES

Moesveld et al.: Chem. Abstracts (1928), vol 22, page 1084.

Olivier et al.: Chem Abstracts (1934) vol. 28, page 6121.

Fierz-David et al.: Journ. Soc. Dyers and Colourists, vol. 53 (1937), pages 424–436.

Glasstone: Textbook of Physical Chemistry, 2nd edition, 946, pages 1006–1008.

Thurston et al.: Jour. Am., Chem., Soc. (1951) vol. 73, pages 2981–83.